US012722468B2

(12) United States Patent
Kashiwagi et al.

(10) Patent No.: US 12,722,468 B2
(45) Date of Patent: Sep. 1, 2026

(54) BATTERY STRUCTURE FOR AN ELECTRIC VEHICLE

(71) Applicants: Teijin Limited, Osaka (JP); Teijin Automotive Technologies, Inc., Auburn Hills, MI (US)

(72) Inventors: Yoshiki Kashiwagi, Osaka (JP); Tsukasa Arai, Osaka (JP); Shota Nagata, Osaka (JP); Hiroshi Miyauchi, Osaka (JP); Masatomo Teshima, Osaka (JP); Hugh Foran, Auburn Hills, MI (US); Max Kamiyama, Osaka (JP)

(73) Assignees: Teijin Limited, Osaka (JP); Teijin Automotive Technologies, Inc., Auburn Hills, MI (US)

( * ) Notice: Subject to any disclaimer, the term of this patent is extended or adjusted under 35 U.S.C. 154(b) by 597 days.

(21) Appl. No.: 18/265,748

(22) PCT Filed: Dec. 2, 2021

(86) PCT No.: PCT/US2021/061569
§ 371 (c)(1),
(2) Date: Jun. 7, 2023

(87) PCT Pub. No.: WO2022/125367
PCT Pub. Date: Jun. 16, 2022

(65) Prior Publication Data

US 2023/0391177 A1 Dec. 7, 2023

Related U.S. Application Data

(60) Provisional application No. 63/122,066, filed on Dec. 7, 2020.

(51) Int. Cl.
*B60K 1/04* (2019.01)
*H01M 50/229* (2021.01)
(Continued)

(52) U.S. Cl.
CPC ............. *B60K 1/04* (2013.01); *H01M 50/229* (2021.01); *H01M 50/242* (2021.01); *H01M 50/249* (2021.01); *B60K 2001/0438* (2013.01); *H01M 2220/20* (2013.01)

(58) Field of Classification Search
CPC ............. B60K 1/04; B60K 2001/0438; H01M 50/242; H01M 50/271; H01M 2220/20; H01M 50/204; H01M 50/249
See application file for complete search history.

(56) References Cited

U.S. PATENT DOCUMENTS 8,835,033 B2 9/2014 Choi et al.
9,056,631 B2 6/2015 Nakamori
(Continued)

FOREIGN PATENT DOCUMENTS

CN 111284566 A 6/2020
DE 102018206118 A1 10/2019
(Continued)

OTHER PUBLICATIONS

Office Action issued in corresponding Japanese Appln. No. 2023-534161, dated Sep. 20, 2024 (with machine translation).
Int'l Search Report for PCT/US2021/061569, dated Mar. 24, 2022.

*Primary Examiner* — Marc Q Jimenez
*Assistant Examiner* — James J Triggs
(74) *Attorney, Agent, or Firm* — MaxGoLaw PLLC

(57) ABSTRACT

A vehicle structure includes a battery tray disposed at a lower portion of a center of a vehicle body, and a cross member extending in a vehicle width direction and inserted into the battery tray. The battery tray includes a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and
(Continued)

raised from the first bottom portion, which are configured with an integrally molded fiber-reinforced plastic. A recessed portion extending in the vehicle width direction is formed by the first inner wall, the second inner wall, and the second bottom portion. The cross member is inserted into at least one location of the recessed portion.

25 Claims, 10 Drawing Sheets

(51) Int. Cl.
*H01M 50/242* (2021.01)
*H01M 50/249* (2021.01)

(56) References Cited

U.S. PATENT DOCUMENTS

| | | | | |
|---|---|---|---|---|
| 10,486,746 | B2 | 11/2019 | Kawabe et al. | |
| 10,886,513 | B2 * | 1/2021 | Stephens ............. | H01M 50/224 |
| 11,370,287 | B2 | 6/2022 | Tsuyuzaki et al. | |
| 2018/0269443 | A1 | 9/2018 | Takahashi et al. | |
| 2018/0337374 | A1 | 11/2018 | Matecki et al. | |

FOREIGN PATENT DOCUMENTS

| | | | |
|---|---|---|---|
| DE | 102019106154 | A1 | 9/2020 |
| JP | H0781624 | A | 3/1995 |
| JP | 2010153130 | A | 7/2010 |
| JP | 2011124101 | A | 6/2011 |
| JP | 2013201112 | A | 10/2013 |
| JP | 2014012524 | A | 1/2014 |
| JP | 2018131133 | A | 8/2018 |
| JP | 2018156825 | A | 10/2018 |
| JP | 2018202886 | A | 12/2018 |
| JP | 2019018823 | A | 2/2019 |
| WO | 2018216614 | A1 | 11/2018 |
| WO | 2020227458 | A1 | 11/2020 |

* cited by examiner 101
102
103
104
105
106
107
108
X
Y
Z 201
202
202
203
203
205
206
207
208
X
Y
Z h1
h3
X
Z
Y
104
303
301
206
304
313
t2
207 h1
h2
402
205
105
104
303
103
407
206
α
409
313
411
408
412
207
β

BATTERY STRUCTURE FOR AN ELECTRIC VEHICLE

TECHNICAL FIELD

The present invention relates to a battery tray disposed at a lower portion of a center of a vehicle, and a vehicle structure in which a cross member extending in a vehicle width direction is inserted into the battery tray.

BACKGROUND ART

In an electric vehicle, since an in-vehicle battery occupies considerable weight and mounting space, numerous studies have been made on a structure of the in-vehicle battery.

In Patent Literature 1, a case in which a battery is housed is configured with a fiber-reinforced plastic, and weight reduction of a battery tray is attempted.

Patent Literature 2 describes a plurality of cross members extending in a lateral direction of a vehicle body below a battery box.

Patent Literature 3 describes a battery pack in which a plurality of batteries are housed and the batteries are connected to each other and fixed to a battery tray.

Patent Literature 4 describes a battery case in which strength and rigidity of a battery tray is enhanced by a metal frame-shaped frame.

CITATION LIST

Patent Literature

Patent Literature 1: JP-A-2013-201112
Patent Literature 2: JP-A-2014-012524
Patent Literature 3: JP-A-2018-156825
Patent Literature 4: JP-A-2011-124101

SUMMARY OF INVENTION

Technical Problem

However, since the shape is flat in the case of using the battery tray described in Patent Literature 1, there is no space into which the cross member can be inserted. Regarding the battery tray described in Patent Literature 1, since it is necessary to provide large battery brackets on both sides of the battery tray, the battery tray becomes large. When such a large battery bracket is provided, it is necessary to increase the width of the vehicle itself in order to install the same amount and number of batteries (the degree of freedom in designing the vehicle is reduced).

Also in the case of using the battery tray described in Patent Literature 2, there is no space for inserting the cross member into the battery tray. Therefore, the cross member is disposed below the battery tray, and the cross member is fastened not to the battery tray but to a vehicle body side. Therefore, when a side surface of the vehicle is collided with, the cross member transmits an impact to the vehicle body, and the structural rigidity of the battery tray cannot be utilized at all.

In the case of the battery tray described in Patent Literature 3, a cross member that is a reinforcing member is provided between batteries, and the batteries are fixed to the cross members. Although the battery does not move relative to the battery tray, it is necessary to provide a cross member separately, and the battery tray becomes heavy. In addition, a step of attaching a cross member, which is a separate component, is required, and the manufacturing process becomes complicated. Since the cross member is placed on the flat plate-shaped battery tray, the structural rigidity of the battery tray cannot be utilized when the side surface of the vehicle is collided with. Therefore, it is necessary to absorb the impact only by the cross member.

In the case of the battery tray described in Patent Literature 4, it is necessary to reinforce the battery tray with a metal frame-shaped frame, and the weight of the battery box cannot be reduced. When an impact is applied to the side surface of the vehicle, the impact needs to be absorbed only by the metal frame-shaped frame. That is, the structural rigidity of the battery tray is not utilized.

In view of the problems of the related art, an object of the present invention is to provide a vehicle structure in which a fiber-reinforced plastic that can be integrally molded is used for a battery tray, and a cross member is inserted from an outside of the battery tray to reinforce the battery tray.

Solution to Problem

As a result of intensive studies, the present inventors have found that the above-described problems can be solved by the following means, and have completed the present invention.

1. A vehicle structure comprising
   a battery tray disposed at a lower portion of a center of a vehicle body, and a cross member extending in a vehicle width direction, which is inserted into the battery tray,
   wherein
   (1) the battery tray includes a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion,
   (2) the first bottom portion, the peripheral wall, the first inner wall, the second inner wall, and the second bottom portion are configured with an integrally molded fiber-reinforced plastic,
   (3) a recessed portion extending in the vehicle width direction is formed by the first inner wall, the second inner wall, and the second bottom portion, and the cross member is inserted into at least one location of the recessed portion.
2. The vehicle structure according to the above 1, wherein the cross member is bent in a protruding shape along the recessed portion.
3. The vehicle structure according to the above 2, wherein the cross member is formed by pressing and bending a flat metal plate to have a protruding shape along the recessed portion.
4. The vehicle structure according to any one of the above 1 to 3, wherein the cross member has a thickness of 0.5 mm or more and 6.0 mm or less.
5. The vehicle structure according to any one of the above 1 to 4, wherein a space is provided between the cross member and the second bottom portion.
6. The vehicle structure according to any one of the above 1 to 5, wherein the cross member is fitted into the recessed portion.
7. The vehicle structure according to any one of the above 1 to 6, wherein the vehicle structure includes a plurality of cross members.

8. The vehicle structure according to any one of the above 1 to 7, wherein the cross member is made of metal or a continuous fiber-reinforced composite material.
9. The vehicle structure according to any one of the above 1 to 8, wherein the battery tray is configured with a fiber-reinforced plastic integrally molded using a sheet molding compound.
10. The vehicle structure according to the above 9, wherein a weight average fiber length of the reinforcing fibers contained in the fiber-reinforced plastic is 1 mm or more.
11. The vehicle structure according to any one of the above 1 to 10, wherein a closed cross section structure is formed by the first inner wall, the second inner wall portion, the second bottom portion, and the cross member when a cross section of the vehicle structure is observed from the vehicle width direction.
12. The vehicle structure according to any one of the above 1 to 11, wherein a natural frequency of the battery tray in a primary mode is 25 Hz or more.
13. The vehicle structure according to any one of the above 1 to 12, wherein a rib integrally molded with the battery tray is provided in at least one location of the recessed portion.
14. The vehicle structure according to any one of the above 1 to 13, wherein an angle formed by the first bottom portion and the first inner wall and an angle formed by the first bottom portion and the second inner wall are 90 degrees or more and 135 degrees or less.
15. The vehicle structure according to any one of the above 1 to 14, wherein a rib or a boss for fixing a battery is provided on an upper surface of the first bottom portion.
16. The vehicle structure according to any one of the above 1 to 15, wherein at least one of the first inner wall and the second inner wall has a shape following a battery shape.
17. The vehicle structure according to any one of the above 1 to 16, wherein the first inner wall and the second inner wall extend at least along the vehicle width direction.
18. The vehicle structure according to any one of the above 1 to 17, wherein discontinuous fibers are continuously dispersed in a boundary area between the first bottom portion and the first inner wall, a boundary area between the first bottom portion and the second inner wall, and a boundary area between the first bottom portion and the peripheral wall.
19. The vehicle structure according to any one of the above 1 to 18,
   wherein the battery tray includes a stud bolt base connected to both the first inner wall and the second inner wall and raised from a first bottom portion, and
   the stud bolt base is configured with a fiber-reinforced plastic integrally molded with the first bottom portion, the peripheral wall, the first inner wall, the second inner wall, and the second bottom portion.
20. The vehicle structure according to the above 19, wherein a stud bolt for attaching a battery bracket is provided on the stud bolt base.
21. The vehicle structure according to the above 20, wherein the stud bolt base includes a non-penetrating insertion hole, and the stud bolt is inserted into the insertion hole.
22. A battery tray disposed in a lower portion of a center of a vehicle body, wherein
   (1) the battery tray comprises a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion,
   (2) the first bottom portion, the peripheral wall, the first inner wall, the second inner wall, and the second bottom portion are configured with an integrally molded fiber-reinforced plastic,
   (3) a recessed portion extending in the vehicle width direction is formed by the first inner wall, the second inner wall, and the second bottom portion, and
   (4) a rib integrally molded with the battery tray is provided in at least one location of the recessed portion.
23. The battery tray according to the above 22, wherein a natural frequency of the battery tray in a primary mode is 25 Hz or more.
24. The vehicle structure according to any one of the above 1 to 20, further comprising an energy absorbing member on an outside of the peripheral wall of the battery tray,
   wherein a lowermost part of the energy absorbing member is located at a lower position than a lowermost part of the battery tray.
25. The vehicle structure according to the above 24,
   wherein the lowermost part of the energy absorbing member is below the first bottom portion of the battery tray, and an uppermost portion of the energy absorbing member is above the first bottom portion of the battery tray.
26. The vehicle structure according to the above 24 or 25, further comprising a protective wall below the battery tray,
   wherein the protective wall is connected to the energy absorbing member.

Advantageous Effects of Invention

In the vehicle structure of the present invention, a cross member can be inserted into at least one location of a recessed portion provided in a battery tray by utilizing the degree of freedom in shape of the battery tray integrally molded with a fiber-reinforced plastic. Accordingly, it is possible to reinforce the weakness of the vertical bending of the battery tray including the recessed portion.

Further, when an impact is applied to a side surface of a vehicle, the structural rigidity of the battery tray can be utilized in addition to a vehicle body.

BRIEF DESCRIPTION OF DRAWINGS

FIG. 9 is a schematic view illustrating a direction in which a battery tray is easily bent.

DESCRIPTION OF EMBODIMENTS

Figure 1:
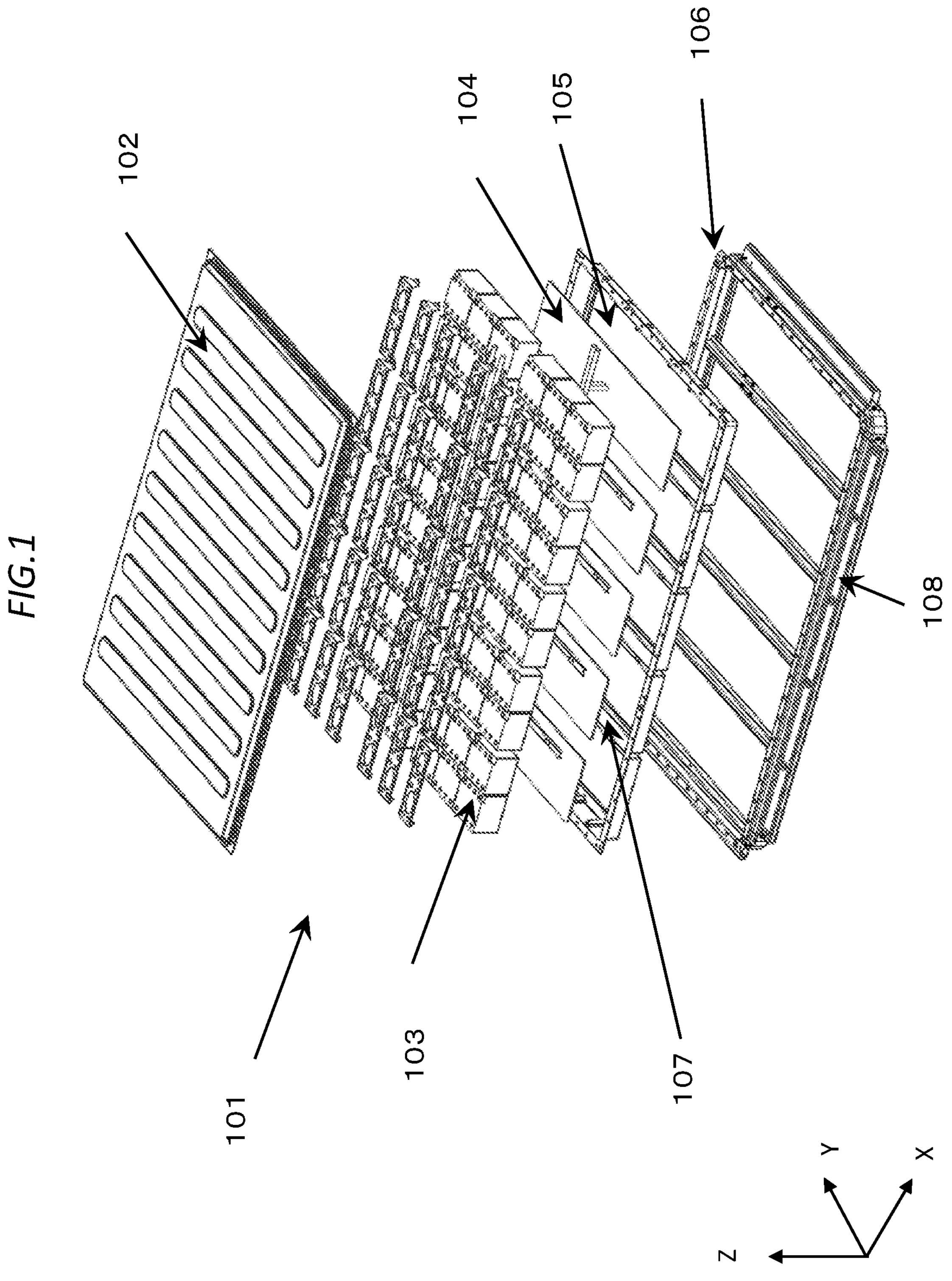
FIG. 1 is an exploded perspective schematic view illustrating an example of a vehicle structure using a battery tray.

Hereinafter, an embodiment of the present invention will be described with reference to the drawings, but the present invention is not limited thereto.

A vehicle structure shown in the drawings is disposed in a lower portion of a center of a vehicle body, and includes a battery box 101 including a battery tray 105 and a battery cover 102, and an energy absorbing member 108. A cross member 701 is inserted into the battery tray 105. Each of the battery tray 105 and the battery cover 102 is configured with an integrally molded fiber-reinforced plastic. The energy absorbing member 108 is used for absorbing impact energy. The battery box 101 stores a battery 103.

Further, a cooling mechanism 104 for temperature control may be provided on the battery tray 105.

Figure 6:
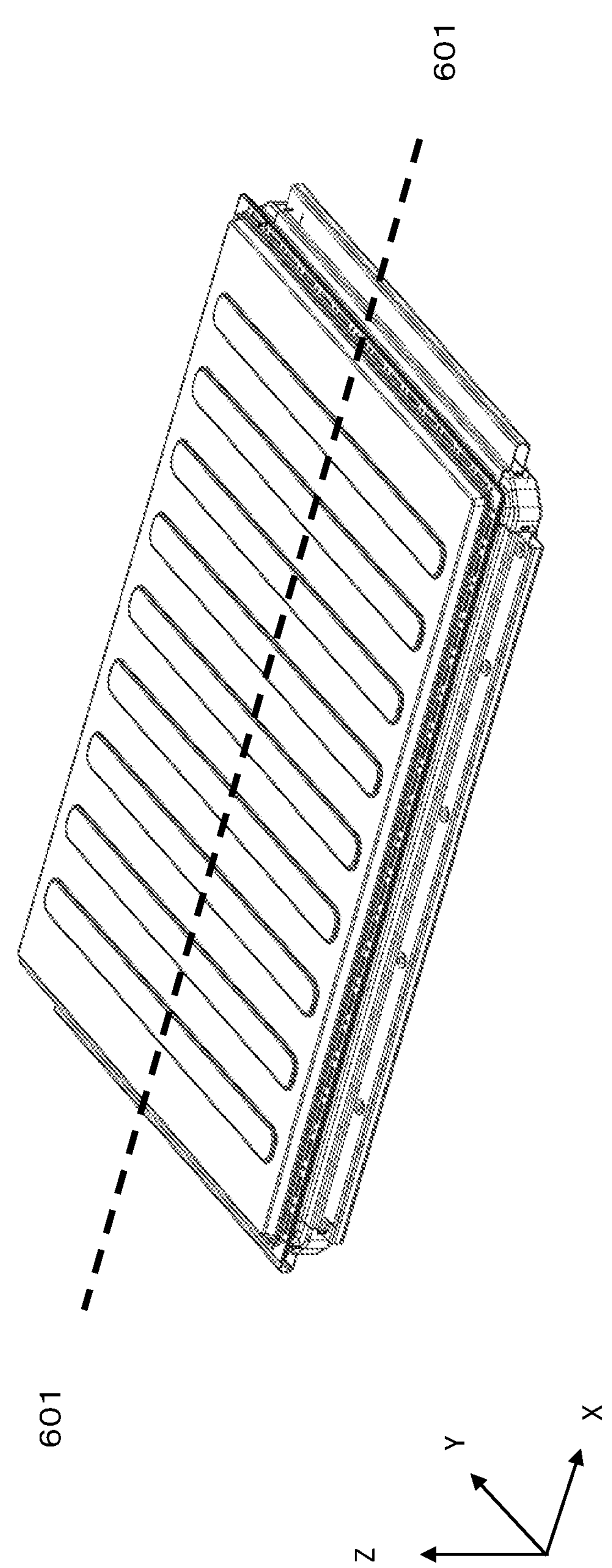
FIG. 6 is a schematic view illustrating an example of a vehicle structure using a battery cover.
Figures 7A, 7B, 7C:
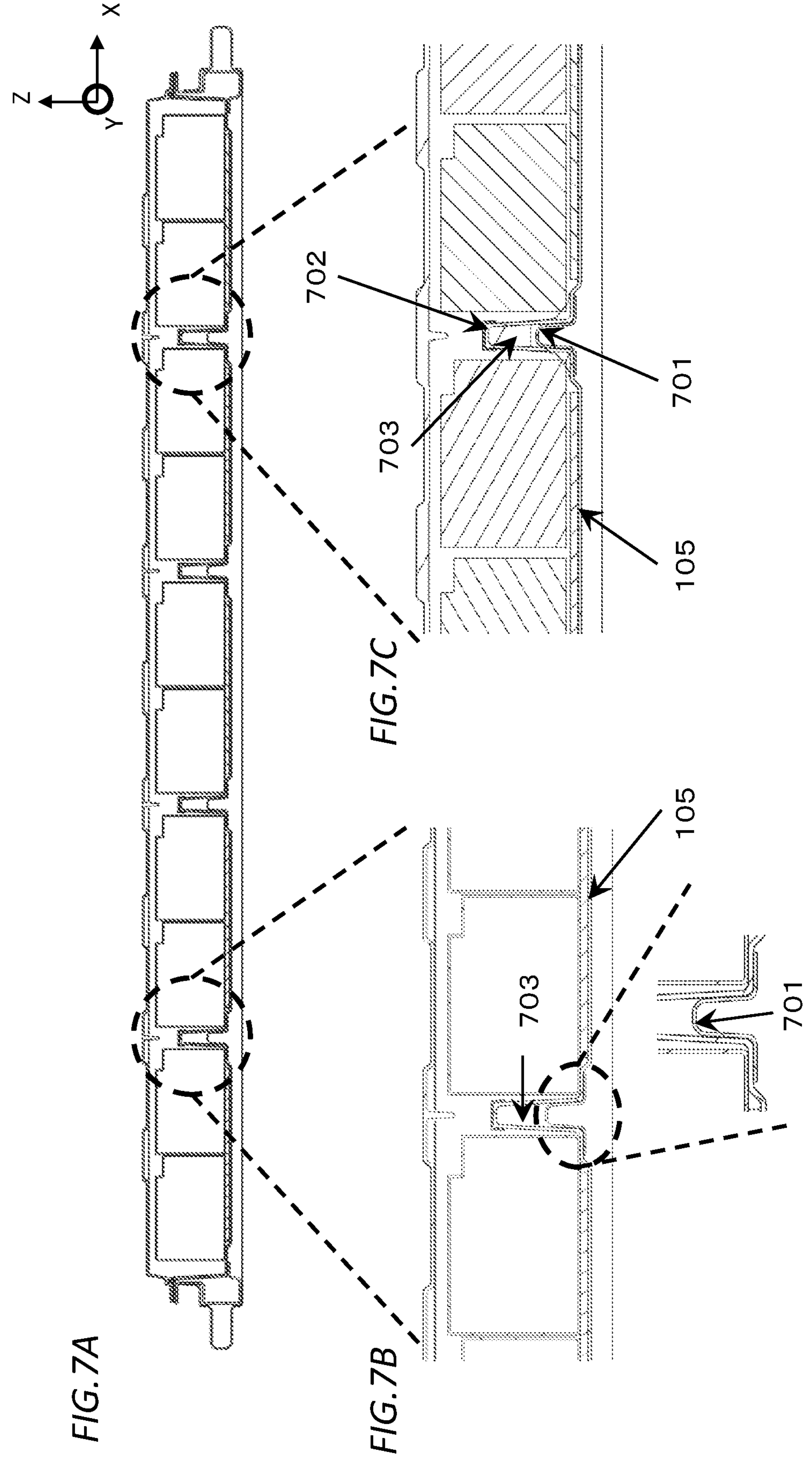
FIG. 7A is a schematic view illustrating a cross section taken along a line 601-601 in FIG. 6.
FIG. 7B is an enlarged schematic view of FIG. 7A such that a cross member can be observed (observation of a position where no rib is provided).
FIG. 7C is an enlarged schematic view of FIG. 7A such that the cross member and the rib can be observed.
Figure 8:
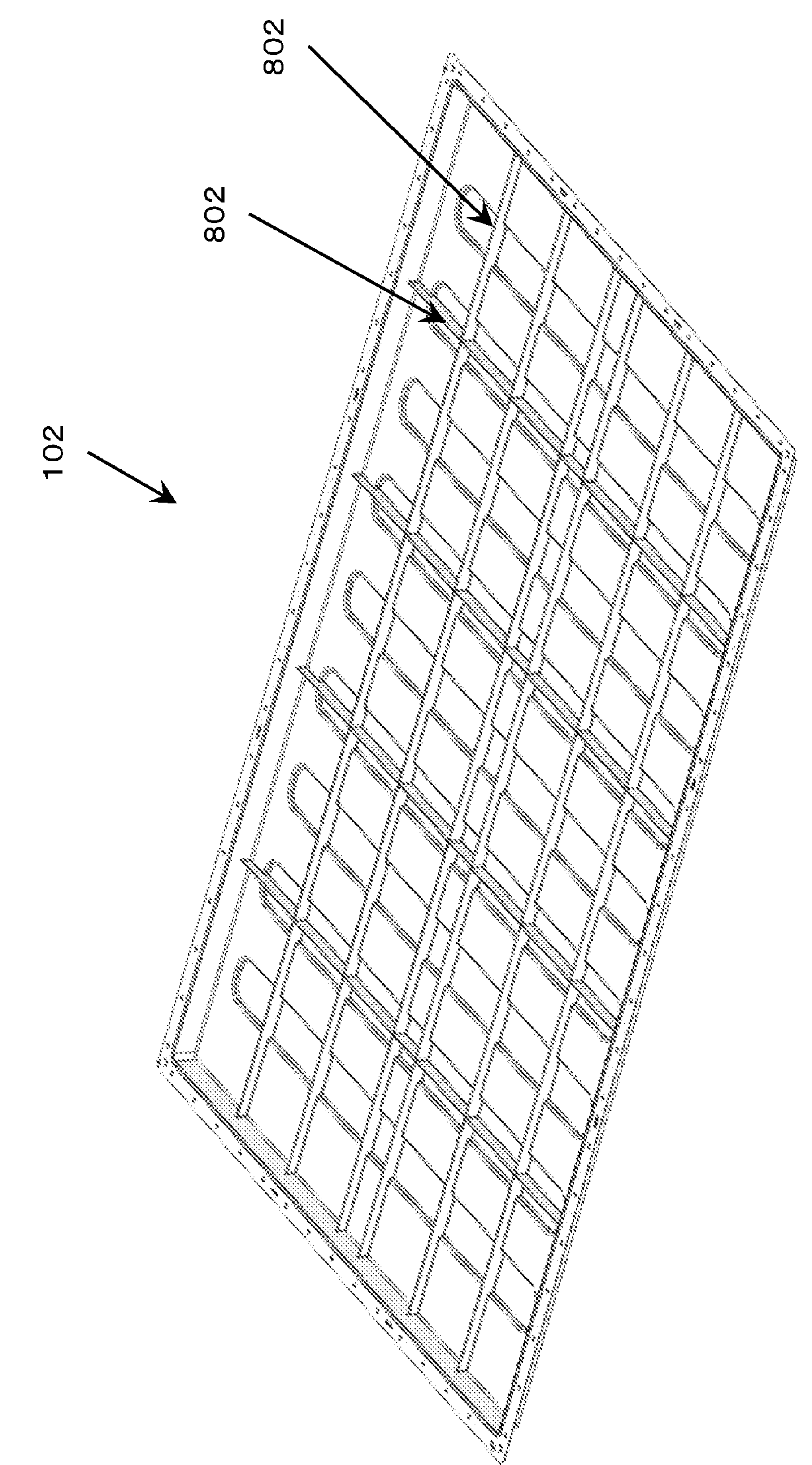
FIG. 8 is a schematic view of an example of a battery cover as viewed from an inside.

The battery cover 102, the battery tray 105, and the energy absorbing member 108 are fastened together. The fastened state is illustrated in FIG. 6. As illustrated in FIGS. 7B and 7C, the cross member 701 is inserted into a recessed portion 208 illustrated in FIG. 2 of the battery tray 105.

[Battery Tray]

The battery tray 105 is a battery tray for driving an automobile, on which the battery 103 for driving a vehicle is mounted. The battery 103 for driving the vehicle is stored in the battery box 101 including the battery tray 105 and the battery cover 102. The battery tray 105 is formed by using a reinforced fiber plastic containing reinforcing fibers and resin.

The battery tray 105 includes a first bottom portion 303 and a peripheral wall 205 erected on an outer periphery of the first bottom portion 303. The battery tray 105 further includes a first inner wall 206 connected to the first bottom portion 303, a second inner wall connected to the first bottom portion 303, and a second bottom portion 301 connected to both the first inner wall 206 and the second inner wall 207 and raised from the first bottom portion.

The first bottom portion 303, the peripheral wall 205, the first inner wall 206, the second inner wall 207, and the second bottom portion 301 are configured with an integrally molded fiber-reinforced plastic.

In this manner, since an inner partition wall 107 is formed by the first inner wall 206 and the second inner wall 207, a wall including the reinforcing fibers up to a tip end can be easily manufactured even if an inner partition wall is formed high from the bottom.

[Flange]

Figure 4:
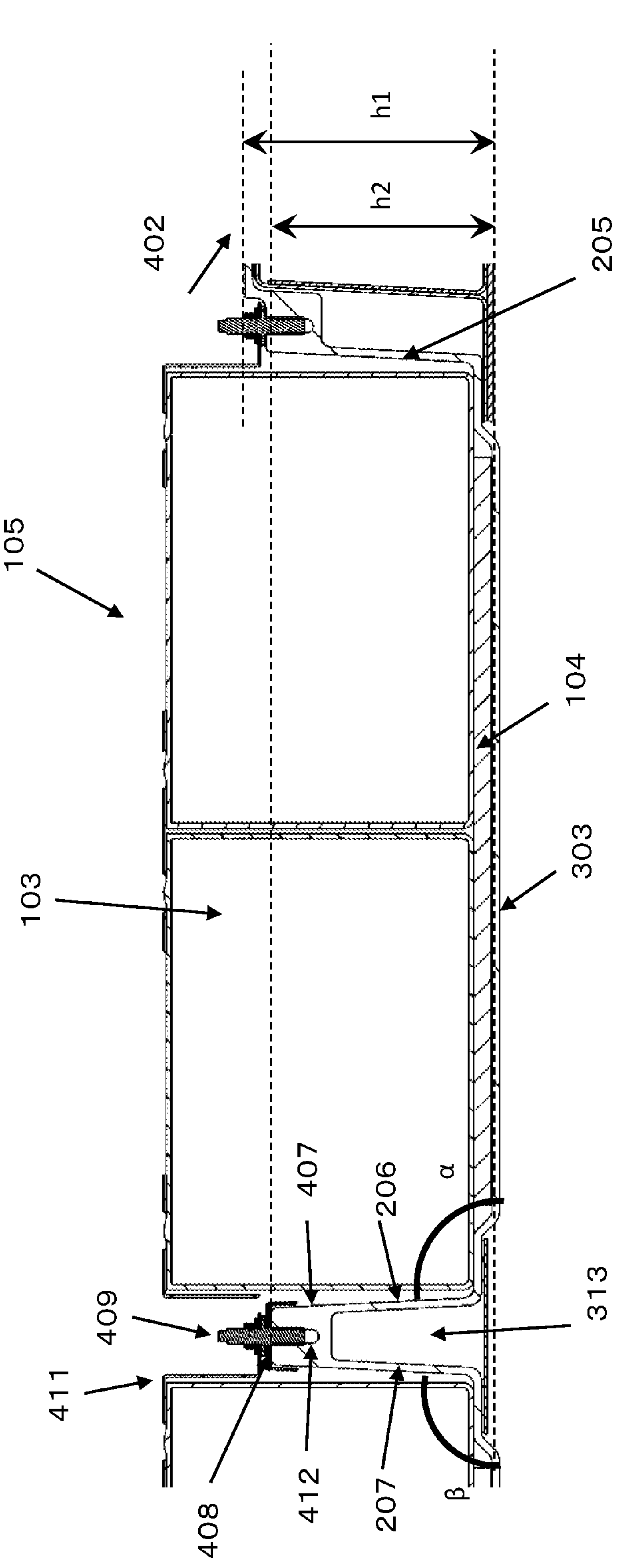
FIG. 4 is a schematic cross-sectional view of an example of the battery tray (a cross section taken along a line 203-203 in FIG. 2, a cross section of a position where a stud bolt base is present).

The battery tray 105 includes, for example, a flange 402 illustrated in FIG. 4. The flange of the battery tray 105 is used to fasten the battery cover 102 and the energy absorbing member 108 together.

[First Bottom Portion]

A lower surface of the first bottom portion 303 is a lowermost surface of the battery tray 105. A battery may be placed on an upper surface of the first bottom portion 303, or the cooling mechanism 104 or a ventilation mechanism may be provided in a space provided between the battery and the first bottom portion. In addition, the first bottom portion does not need to have a completely flat plate shape, and may have a wavy shape like a corrugated shape, or may have a curved surface.

[Peripheral Wall]

The peripheral wall 205 is erected on the outer periphery of the first bottom portion 303, and is preferably formed continuously with the surfaces of the first bottom portion 303.

[First Inner Wall and Second Inner Wall]

The first inner wall 206 is connected to the first bottom portion 303. The fiber-reinforced plastic that forms the battery tray is bent between the first inner wall 206 and the first bottom portion 303. The first bottom portion 303 is continuously connected to the first inner wall 206, and the first bottom portion 303 and the first inner wall 206 are integrally molded without a seam.

Similarly, the second inner wall 207 is connected to the first bottom portion 303. The fiber-reinforced plastic that forms the battery tray is bent between the second inner wall 207 and the first bottom portion 303. The first bottom portion 303 is continuously connected to the second inner wall 207, and the first bottom portion 303 and the second inner wall 207 are integrally molded without a seam. When the fiber-reinforced plastic is used, it is possible to easily perform integral molding without a seam.

The first inner wall 206 and the second inner wall 207 are formed by bending the fiber-reinforced plastic that forms the battery tray.

[Inner Partition Wall]

Figure 2:
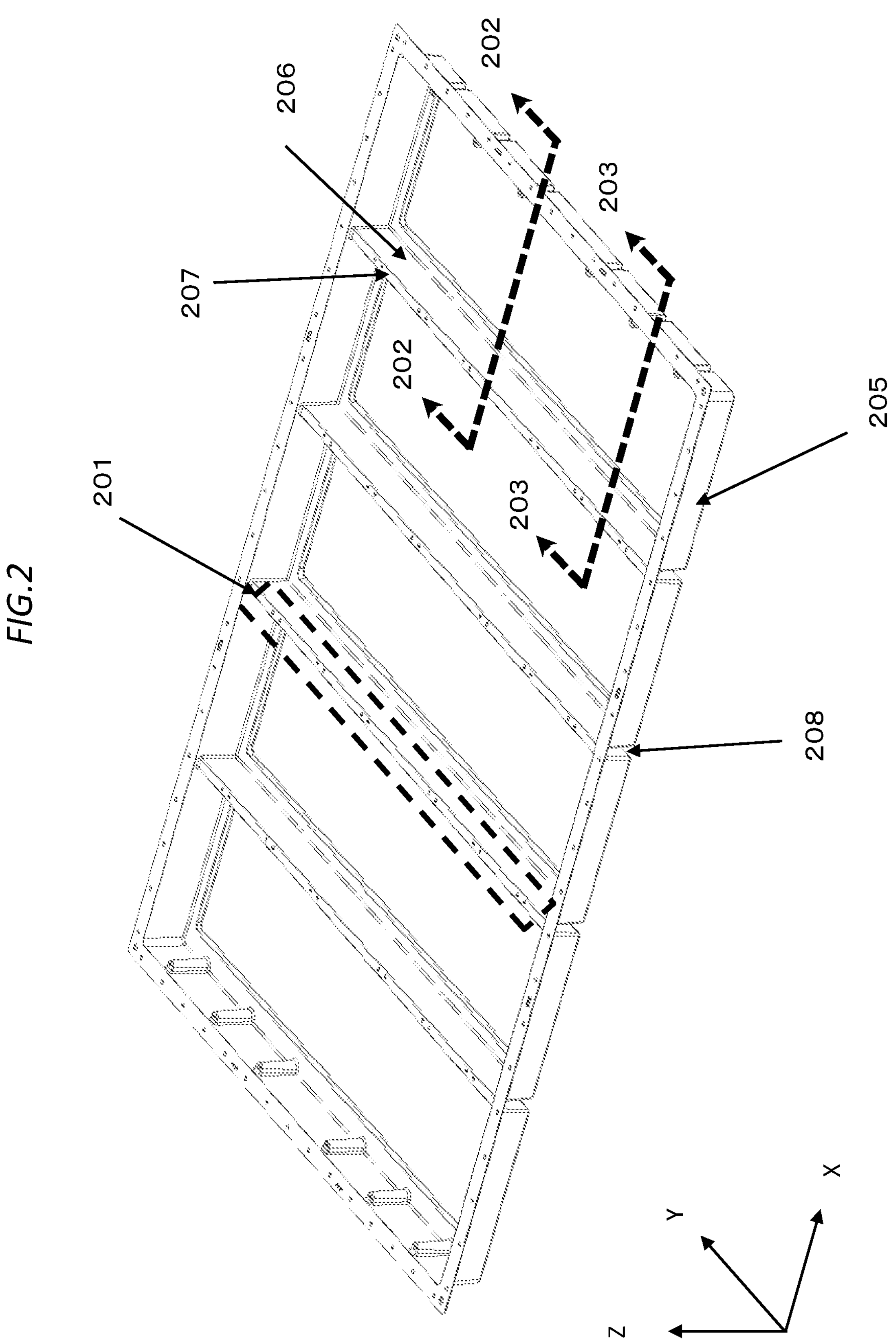
FIG. 2 is a schematic perspective view illustrating an example of a battery tray.

The first inner wall 206 and the second inner wall 207 form the inner partition wall 107 illustrated in FIG. 1, which partitions an inside of the battery tray 105. There may be two or more such inner partition walls 107. In FIGS. 1 and 2, the inner partition walls 107 are formed in a Y-axis direction, and a total of four inner partition walls 107 extend. It is preferable that an X axis in FIGS. 1 and 2 represents an axle direction (a traveling direction of a vehicle) and a Y axis represents a vehicle width direction.

[Stud Bolt Base]

The battery tray 105 may include a stud bolt base 407 connected to both the first inner wall 206 and the second inner wall 207 and raised from the first bottom portion 303. The stud bolt base 407 is a fiber-reinforced plastic integrally molded with the first bottom portion 303, the peripheral wall 205, the first inner wall 206, the second inner wall 207, and the second bottom portion 301. It is preferable that the stud bolt base 407 is connected to both the first inner wall 206 and the second inner wall 207 and raised from the first bottom portion 303. The first inner wall 206 and the second inner wall 207 may be connected to each other via the stud bolt base 407.

In other words, the battery tray 105 preferably includes the flange 402, the first bottom portion 303, the peripheral wall 205 erected on the outer periphery of the first bottom portion 303, the first inner wall 206 connected to the first bottom portion 303, the second inner wall 207 connected to the first bottom portion 303, and the stud bolt base 407 connected to both the first inner wall 206 and the second inner wall 207 and raised from the first bottom portion 303.

When the stud bolt base 407 is provided in the battery tray 105, it is not necessary to provide the stud bolt base 407 as a separate component. The battery tray 105 that is a component of the battery box 101 is an integrally molded fiber-reinforced plastic, so that the stud bolt base 407 is provided as soon as the molding of fiber-reinforced plastic is completed.

[Integral Molding]

The first bottom portion 303, the peripheral wall 205, the first inner wall 206, the second inner wall 207, and the second bottom portion 301 are configured with an integrally molded fiber-reinforced plastic. In a preferable embodiment, the stud bolt base 407 for fixing the battery can also be integrally molded, and further, the flange 402, the first bottom portion 303, the peripheral wall 205, the first inner wall 206, the second inner wall 207, and the stud bolt base 407 are configured with an integrally molded fiber-reinforced plastic.

Here, the integral molding means that these components are continuously molded without a seam and are not molded by joining separate members to each other. Such integral molding can be implemented by producing a fiber-reinforced plastic in one molding, and preferably by press molding. A fiber-reinforced plastic may be produced by integrally molding a sheet molding compound (also may be referred to as SMC).

Since a component is formed by integral molding, separate components can be processed as one component, and a unit price of the component can be reduced. In addition, the number of assembling steps is reduced, and the cost related to stock can be reduced by reducing the number of components.

[Second Bottom Portion]

The first inner wall 206 and the second inner wall 207 are also connected to each other via the second bottom portion 301, and the second bottom portion 301 is preferably raised by the first inner wall 206 and the second inner wall 207. In other words, the first inner wall 206 and the second inner wall 207 form the inner partition wall 107, and the second bottom portion 301 is a bottom portion of a top of the inner partition wall 107.

Figure 3:
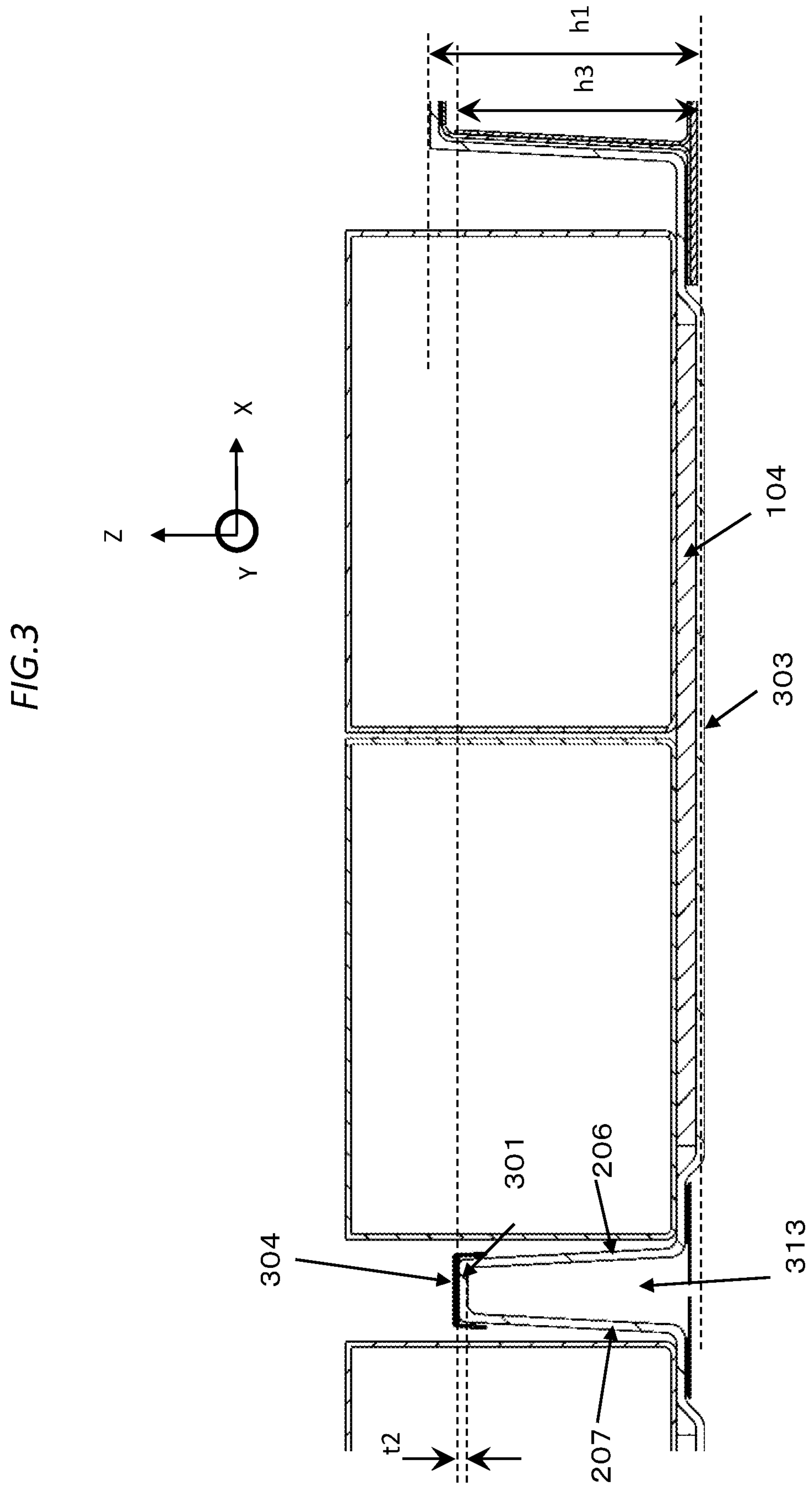
FIG. 3 is a schematic cross-sectional view of an example of the battery tray (a cross section taken along a line 202-202 in FIG. 2, and a cross section of a position where no stud bolt base is provided).

FIG. 3 is a cross-sectional view taken along a line 202-202 of FIG. 2, in which the second bottom portion 301 is drawn on the bottom portion of the top of the inner partition wall 107 formed by the first inner wall 206 and the second inner wall 207.

FIG. 3 is a cross-sectional view of a position where it is not necessary to provide an insertion hole 412 of the stud bolt, and thus the stud bolt base 407 is not drawn.

An opposite surface of the second bottom portion 301 may be covered with a metal cover 304, and the rigidity may be improved.

[Height of Second Bottom Portion]

A height h1 from the first bottom portion to the flange and a height h3 from the first bottom portion to the upper surface of the second bottom portion preferably satisfy a relation of $h1\times0.3<h3<h1\times2.0$. The heights h1 and h3 are illustrated in FIG. 3. When the second bottom portion is a curved surface or the like, a length at which h3 is maximum is measured.

The height of the inner partition wall is increased in the case of $h1\times0.3<h3$, and therefore the battery (103, 410) can be stably held. Regarding a lower limit value of h3, $h1\times0.5<h3$ is more preferable, $h1\times0.6<h3$ is still more preferable, and $h1\times0.7<h3$ is yet still more preferable.

Regarding an upper limit value of h3, $h3<h1\times1.8$ is more preferable, $h3<h1\times1.5$ is still more preferable, $h3<h1\times1.2$ is yet still more preferable, and $h3<h1\times1.0$ is most preferable.

[Cross Member]

In the vehicle structure of the present invention, as illustrated in FIGS. 7B and 7C, the cross member 701 is inserted into the battery tray 105. Note that the term "cross" means a member in the vehicle width direction (Y-axis direction in FIG. 1).

[Cross Member: Arrangement]

Specifically, the recessed portion 208 extending in the vehicle width direction is formed by the first inner wall 206, the second inner wall portion 207, and the second bottom portion 301, and the cross member 701 is preferably inserted into at least one location of the recessed portion 208. The recessed portion 208 forms a space area 313 surrounded by the first inner wall 206, the second inner wall 206, and the second bottom portion 301.

After the cross member 701 is inserted into the recessed portion 208, a space 703 is preferably provided between the cross member 701 and the second bottom portion 301. The space 703 is provided, and thereby it is possible to avoid a striking noise caused by the cross member 701 and the battery tray 105.

It is preferable that a plurality of the cross members 701 exist, and it is more preferable that the cross members 701 are inserted into two or more locations of the recessed portion 208 extending in the vehicle width direction and formed by the first inner wall 206, the second inner wall 207, and the second bottom portion 301. It is more preferable that the cross members are inserted into all of the recessed portions 208.

The cross member 701 preferably extends in the vehicle width direction of the battery tray 105, and as illustrated in FIG. 2, may extend from an end of the battery tray 105 in the vehicle width direction to the opposite end.

[Cross Member: Shape]

The shape of the cross member 701 is not particularly limited, and when a cross section of the cross member 701 is observed from the vehicle width direction (the Y-axis direction in FIG. 2), the cross section may have a T-shape, an L-shape, or a combination thereof. The cross member 701 is preferably bent in a protruding shape along the recessed portion 208 formed by the first inner wall 206, the second inner wall 207, and the second bottom portion 301 so as to extend in the vehicle width direction. In other words, when a cross section of the vehicle structure is observed in the vehicle side surface direction, it is preferable that the cross member is bent so as to form an upward protruding shape, and is inserted into the recessed portion 208. FIGS. 7B and 7C illustrates a bent cross member 701. The cross member 701 is preferably bent in a protruding shape along the recessed portion 208 by pressing a flat metal plate. Here, "along the recessed portion" means that it is not necessary to be completely along the recessed portion, and may be substantially along the recessed portion.

When the cross section of the vehicle structure is observed from the vehicle width direction, it is preferable to form a closed cross section structure 703 as illustrated in FIGS. 7B and 7C by the first inner wall 206, the second inner wall 207, the second bottom portion 301, and the cross member 701. In order to avoid the striking noise between the cross member 701 and the second bottom portion 301, it is preferable to set the height of the protruding shape of the cross member 701 to such a degree that the cross member 701 does not come into contact with the second bottom portion 301.

[Cross Member: Fitting]

It is preferable that the cross member 701 extends in the vehicle width direction and is fitted into the recessed portion 208. In this case, the cross member 701 preferably has a protruding shape as illustrated in FIGS. 7B and 7C. That is, it is preferable that the protruding part of the cross member 701 is fitted with the recessed portion 208 extending in the vehicle width direction and formed by the first inner wall 206, the second inner wall 207, and the second bottom portion 301.

[Cross Member: Joining]

The cross member 701 is preferably bonded to the first bottom portion 303, and may be bonded to the first bottom portion 303 with an adhesive. In the case of adhesion, it is not necessary to form a hole in the battery tray 105 and airtightness is improved, as compared with the case of fastening.

[Cross Member: Material]

The cross member 701 is preferably a metal or a continuous fiber-reinforced composite material. When the continuous fiber-reinforced composite material is used, fibers are preferably oriented in the vehicle width direction (the Y-axis direction in FIG. 2). The metal may be an alloy.

[Cross Member: Thickness]

A thickness of the cross member 701 is preferably 0.5 mm or more and 6.0 mm or less, more preferably 1.0 mm or more and 5.0 mm or less, and still more preferably 1.0 mm or more and 4.0 mm or less.

[Effects of Cross Member Arrangement]

Figure 9:
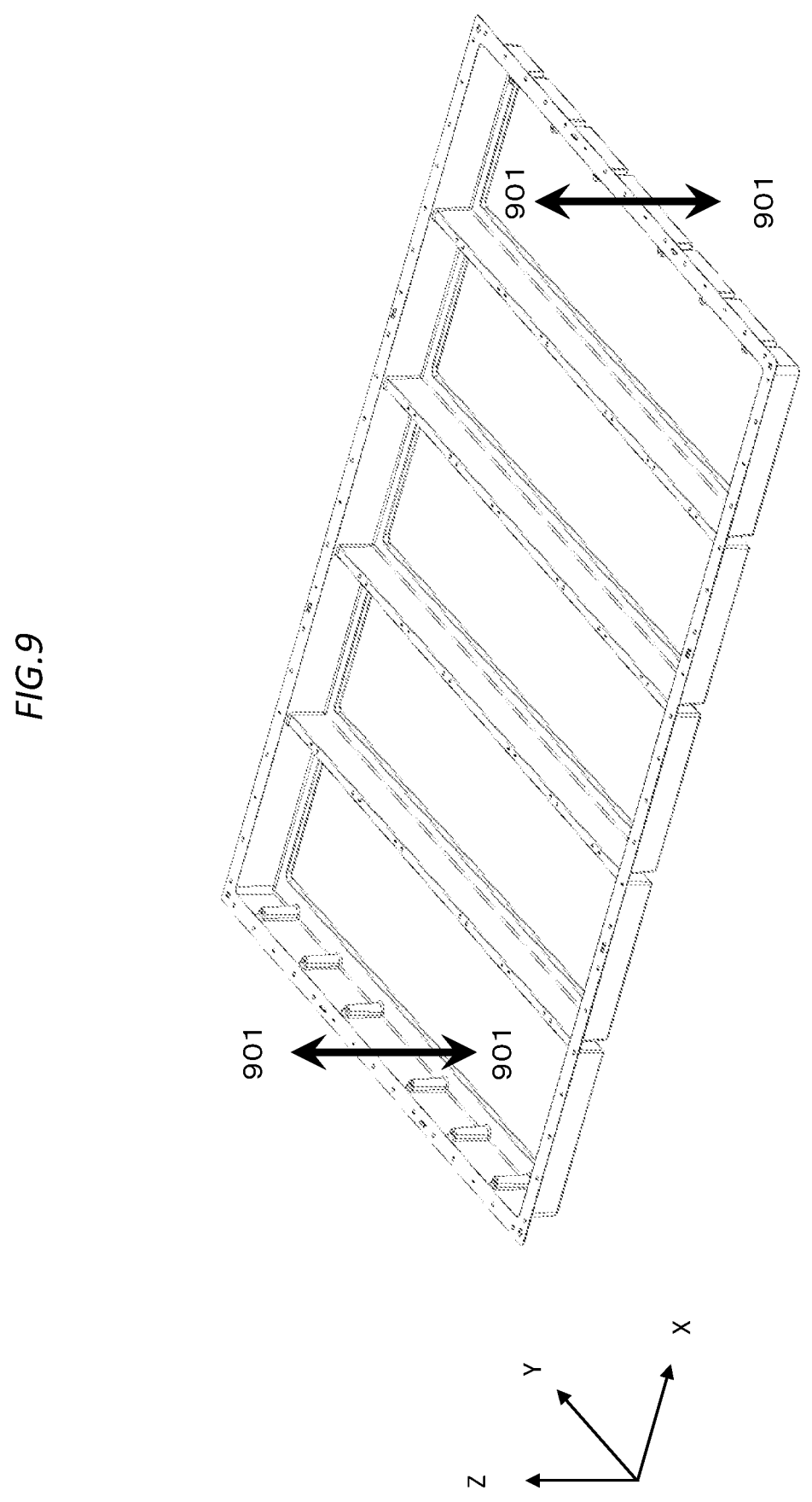

The battery tray 105 includes the recessed portion 208, and the recessed portion 208 forms the space area 313 surrounded by the first inner wall 206, the second inner wall 207, and the second bottom portion 301. Since the recessed portion 208 is provided, the battery tray 105 is easily bent in the up-down direction. More specifically, the bending in the up-down direction is a bending in a direction of an arrow 901 in FIG. 9, and is a bending of an end portion of the battery tray 105 in a front-rear direction of a vehicle.

The cross member 701 is inserted into the recessed portion 208 of the battery tray 105, and the first bottom portion 303 is joined to the cross member 701, thereby controlling bending in the up-down direction (the direction of the arrow 901 in FIG. 9) due to vibration. When the cross member 701 extends in the vehicle width direction and is fitted and joined to the recessed portion 208, the bending of the cross member 701 can be further controlled.

[Rib of Recessed Portion of Battery Tray]

In the vehicle structure of the present invention, it is preferable that a rib 702 integrally formed with the battery tray 105 is provided in at least one location of the recessed portion 208 as illustrated in FIG. 7C. In other words, it is preferable that the rib 702 is provided in at least one location of an extending recessed portion 208 among recessed portions 208 extending in the vehicle width direction and formed by the first inner wall 206, the second inner wall 207, and the second bottom portion 301. It is more preferable that a plurality of ribs 702 are provided intermittently in the extending direction in the extending recessed portion 208. FIG. 7C depicts a portion where the rib 702 is present in the recessed portion of the battery tray 105, whereas FIG. 7B depicts a portion where the rib 702 is absent in the recessed portion of the battery tray 105.

A thickness of the rib 702 in the recessed portion 208 of the battery tray 105 is preferably 1 mm or more and 4 mm or less, and more preferably 2.5 mm or more and 3 mm or less. A height of the rib 702 is preferably 10 mm or more and 30 mm or less. The thickness of the rib 702 is a thickness in the Y-axis direction in FIGS. 7A to 7C, and the height of the rib 702 is a height in the Z-axis direction in FIGS. 7A to 7C.

By providing the rib 702 in the recessed portion 208 of the battery tray 105, it is possible to control bending in the vertical direction (the direction of the arrow 901 in FIG. 9) due to vibration.

[Natural Frequency of Battery Tray in Primary Mode]

The natural frequency of the battery tray 105 in the primary mode is preferably 25 Hz or more. In general, since the natural frequency of the vehicle body is 25 Hz or less, it is preferable to design the battery tray 105 so as not to resonate with the vehicle body. The natural frequency of the battery tray 105 in the primary mode is more preferably 30 Hz or more, still more preferably 35 Hz or more, and yet still more preferably 40 Hz or more.

More specifically, it is preferable that the rib 702 integrally molded with the battery tray 105 is provided in at least one location of the recessed portion 208, and thus the natural frequency of the battery tray 105 in the primary mode is 25 Hz or more. The battery tray 105 includes the recessed portion 208, so that the natural frequency in the primary mode can be easily 25 Hz or more. Alternatively, the rib 702 is further provided in the recessed portion 208, so that the natural frequency of the battery tray 105 in the primary mode can be more easily 25 Hz or more.

It is preferable that the rib 702 and the cross member 701 do not come into contact with each other and there is a space therebetween. Since the rib 702 and the cross member 701 do not come into contact with each other, it is possible to avoid the striking noise between the rib 702 and the cross member 701.

Focusing only on vibration control, there is no problem even if the cross member 701 is absent. Therefore, the following invention is described as the battery tray 105 excluding the cross member 701 from the vehicle structure of the present invention.

[Battery Tray Provided with Rib]

A battery tray is the battery tray 105 disposed at a lower portion of a center of a vehicle body, (1) The battery tray 105 includes the first bottom portion 303, the peripheral wall 205 erected on an outer periphery of the first bottom portion 303, the first inner wall 206 connected to the first bottom portion 303, the second inner wall 207 connected to the first bottom portion 303, and the second bottom portion 301 connected to both the first inner wall 206 and the second inner wall 207 and raised from the first bottom portion 303;

(2) The first bottom portion 303, the peripheral wall 205, the first inner wall 206, the second inner wall 207, and the second bottom portion 301 are formed by an integrally molded fiber-reinforced plastic;

(3) The recessed portion 208 extending in the vehicle width direction is formed by the first inner wall 206, the second inner wall portion 207, and the second bottom portion 301; and (4) The rib integrally molded with the battery tray 105 is provided in at least one location of the recessed portion 208.

[Angle]

An angle formed by the first bottom portion 303 and the first inner wall 206 is illustrated by $\alpha$ in FIG. 4. An angle formed by the first bottom portion 303 and the second inner wall 207 is illustrated by $\beta$ in FIG. 4.

The angle $\alpha$ formed by the first bottom portion 303 and the first inner wall 206 and the angle $\beta$ formed by the first bottom portion 303 and the second inner wall 207 are preferably 90 degrees or more and 135 degrees or less. When the angles $\alpha$ and $\beta$ are 90 degrees or more, it is easy to take out the battery tray from a molding die during molding. On the other hand, when the angles $\alpha$ and $\beta$ are 135 degrees or less, shapes of the first inner wall 206 and the second inner wall 207 can be easily matched with a shape of the battery 103 even when the shape of the battery 103 is a rectangular parallelepiped or a cube.

In other words, when the angle $\alpha$ formed by the first bottom portion 303 and the first inner wall 206 and the angle $\beta$ formed by the first bottom portion 303 and the second inner wall 207 are 90 degrees or more and 135 degrees or less, a size of the battery 103 can be increased with respect to the battery tray 105 per unit volume.

The angle $\alpha$ formed by the first bottom portion 303 and the first inner wall 206 and the angle $\beta$ formed by the first bottom portion 303 and the second inner wall 207 are more preferably 90 degrees or more and 120 degrees or less, and still more preferably 90 degrees or more and 100 degrees or less.

In order to measure the angle $\alpha$ formed by the first bottom portion 303 and the first inner wall 206 and the angle $\beta$ formed by the first bottom portion 303 and the second inner wall 207, a cross section of the battery tray 105 may be observed. The direction of cross-section observation is preferably a direction perpendicular to the first inner wall 206 or the second inner wall 207 (for example, cross-section observation in FIG. 4).

When the first bottom portion 303, the first inner wall 206, or the second inner wall 207 has a curved shape during the cross-section observation, a tangent line is drawn to the curve to measure an angle with the tangent line, and a maximum angle and a minimum angle are averaged to calculate the angle $\alpha$ or the angle $\beta$.

[Stud Bolt and Stud Bolt Base]

The battery tray 105 of the present invention preferably includes, on the stud bolt base 407, a stud bolt 409 for attaching a battery bracket. The first inner wall 206 and the second inner wall 207 are connected to each other via the stud bolt base 407. In other words, it is preferable that the stud bolt base 407 is provided at a location on the top of the inner partition wall 208.

In addition, the stud bolt base 407 may include a non-penetrating insertion hole 412, and the stud bolt 409 may be inserted into the insertion hole 412.

The stud bolt 409 is a bolt in which screw portions are formed at both ends, and one end of the stud bolt 409 is screwed into the insertion hole of the stud bolt base 407. A battery bracket 411 for fixing a battery is fastened to an opposite side. A shape of the stud bolt 409 is not particularly limited.

Figures 5A, 5B, 5C:
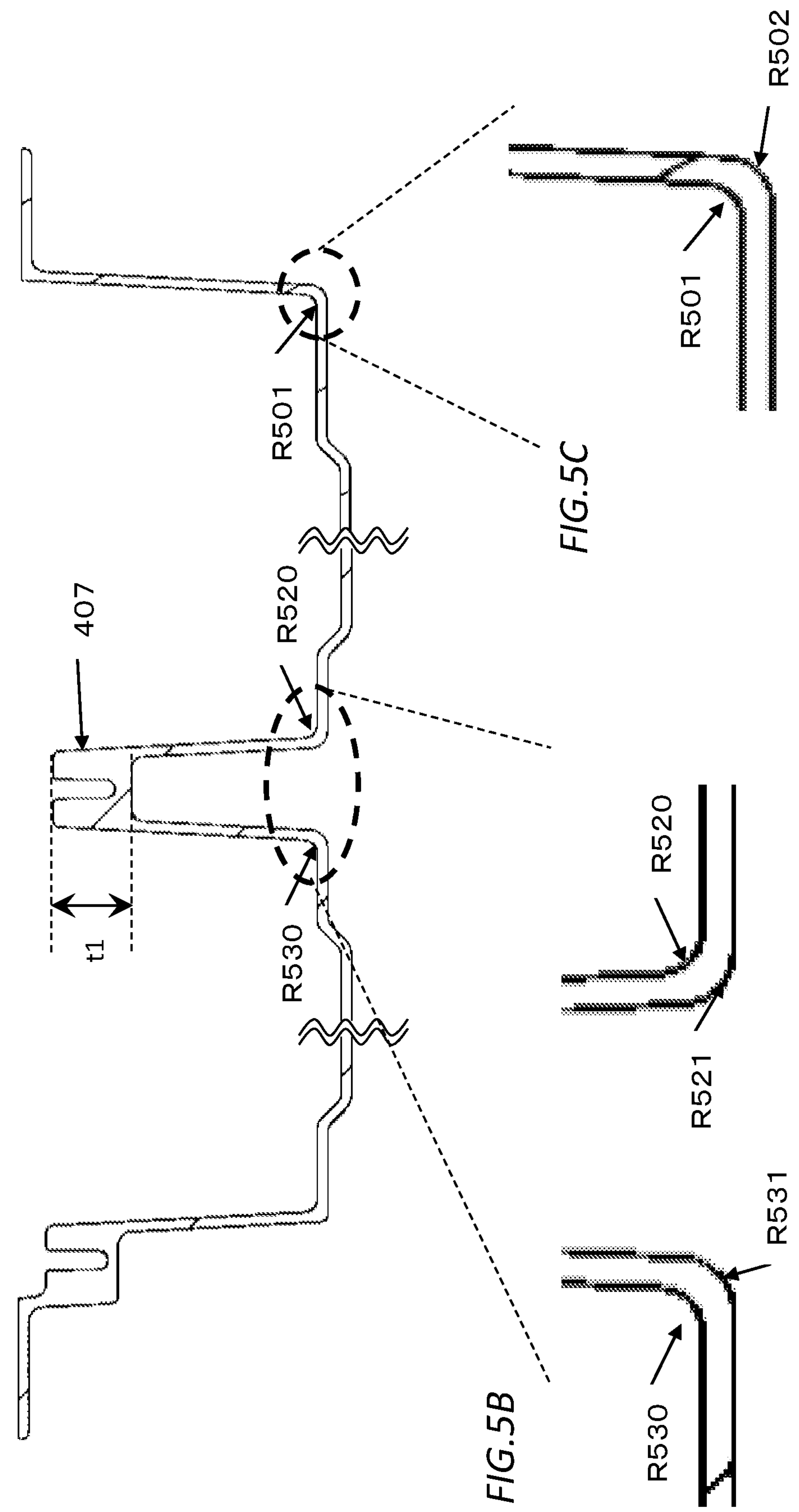
FIG. 5A is a schematic cross-sectional view of an example of a battery tray.
FIG. 5B is an enlarged view of a boundary area between a first bottom portion 303 and a first inner wall 206 and a boundary area between the first bottom portion 303 and a second inner wall 207 in FIG. 5A.
FIG. 5C is an enlarged view of a boundary area between the first bottom portion 303 and a peripheral wall 205 in FIG. 5A.

A thickness t1 of the stud bolt base 407 illustrated in FIG. 5A and a thickness t2 of the second bottom portion 301 illustrated in FIG. 3 preferably satisfy $t2 < t1$. In other words, it is preferable that a thickness of a top portion 201 of the inner partition wall 208 formed by the first inner wall 206 and the second inner wall 207 contributes to form an uneven thickness structure toward the Y-axis direction (vehicle width direction). The top portion 201 is preferably a repeated structure of the stud bolt base 407 and the second bottom portion 301. The thickness t2 of the second bottom portion is designed to be smaller than the thickness t1 (also referred to as a wall thickness) of the stud bolt base, so that the weight of the battery tray 105 can be reduced. It is more preferable to satisfy $t2 \times 0.8 < t1$, and it is still more preferable to satisfy $t2 \times 0.5 < t1$.

The flange 402, the first bottom portion 303, the peripheral wall 205, the first inner wall 206, the second inner wall 207, the stud bolt base 407, and the second bottom portion 301 are formed by an integrally molded fiber-reinforced plastic.

[Through Hole for Fixing Battery]

In order to fasten a battery to the battery tray, it is necessary to provide a through hole in a battery tray and fix a battery bracket to a battery tray in the case of the battery tray according to the related art.

In a preferable embodiment of the present invention, the stud bolt base 407 is configured with a fiber-reinforced plastic integrally molded with the battery tray 105, and is an uneven thickness structure having a thickness. That is, a through hole for fixing the battery 103 cannot be provided in the first inner wall 206, the second inner wall 207, the first bottom portion 303, and the stud bolt base 407. Such a through hole is not provided, so that the sealability of the battery box 101 can be improved, the humidity in the battery box 101 can be stabilized, and the life of the battery can be extended. In addition, it is preferable that a through hole for fixing the battery 103 is not provided in the peripheral wall 205.

[Height of Stud Bolt Base]

A height h1 from the first bottom portion 303 to the flange 402 and a height h2 from the first bottom portion 303 to an upper surface of the stud bolt base 407 preferably satisfy $h1 \times 0.3 < h2 < h1 \times 2.0$.

Since the first bottom portion 303 has a thickness, the height h1 is measured with reference to a vertical center of the first bottom portion 303. When the first bottom portion 303 has a wavy shape like a corrugated shape or has a curved surface, a length at which h2 is maximum is measured.

The heights h1 and h2 are illustrated in FIG. 4.

When $h1 \times 0.3 < h2$ is satisfied, a position of the stud bolt base 407 is higher than the first bottom portion 303, so that a position of the stud bolt 409 for attaching the battery bracket 411 can be higher. As a result, a fixing position of the battery bracket 411 for fixing the battery is raised, so that the length of the battery bracket 411 can be reduced. Since the battery bracket 411 is generally configured with metal such as aluminum, it is possible to contribute to weight reduction by reducing the length of the battery bracket 411.

Regarding a lower limit value of h2, $h1 \times 0.5 < h2$ is more preferable, $h1 \times 0.6 < h2$ is still more preferable, and $h1 \times 0.7 < h2$ is yet still more preferable.

Regarding an upper limit value of h2, $h2 < h1 \times 1.8$ is more preferable, $h2 < h1 \times 1.5$ is still more preferable, $h2 < h1 \times 1.2$ is yet still more preferable, and $h2 < h1 \times 1.0$ is most preferable.

When $h1 \times 0.3 < h2 < h1 \times 2.0$ is satisfied, the space area 313 surrounded by the first inner wall 206, the second inner wall 207, and the stud bolt base 407 becomes large as illustrated in FIG. 4. When the space area 313 is large, the cross member 701 can be easily inserted even if the stud bolt base 407 is provided.

A relation between the height h2 from the first bottom portion 303 to the upper surface of the stud bolt base 407 and a height h3 from the first bottom portion 303 to an upper surface of the second bottom portion 301 is preferably $h2\times0.8<h3<h1\times1.2$, more preferably $h2\times0.9<h3<h1\times1.1$, and still more preferably $h2=h3$.

[Rib and Boss for Fixing Battery]

A rib or a boss for fixing the battery 103 is preferably provided on the upper surface of the first bottom portion 303 of the battery tray 105. The upper surface of the first bottom portion is a surface, on which a battery is placed, of the battery tray 105. A lower surface is an opposite surface of the upper surface. It is preferable that the rib or the boss fixes not only the battery but also the wires and the cooling mechanism 104.

Here, the term "fixing" refers to inhibiting movement of the battery, and does not mean complete fixing.

A relation between a height hr of the rib and a height hb of the battery is preferably $hb\times0.3<hr$, and more preferably $hb\times0.5<hr$. More specifically, the height hr of the rib is preferably 20 to 70 mm, more preferably 30 to 60 mm, and still more preferably 40 to 50 mm Within this range, the rigidity of the battery tray 105 can also be improved.

In addition, it is preferable that the rib or the boss for fixing the battery is integrally molded as a fiber-reinforced plastic. The rib or the boss is provided by integral molding with the fiber-reinforced plastic, so that the fixing of the battery can be easily reinforced.

[Shapes of First Inner Wall and Second Inner Wall]

1. Shape Following Battery Shape

At least one of the first inner wall 206 and the second inner wall 207 preferably has a shape following the battery shape. It is more preferable that the first inner wall 206 and the second inner wall 207 have a shape following the battery shape. In other words, it is more preferable that the inner partition wall 208 has a shape following the battery shape.

The shape following the battery shape means that the shape of the first inner wall 206 or the second inner wall 207 is designed along the shape of the battery. For example, when the battery 103 is a cube or a rectangular parallelepiped, the first inner wall 206 or the second inner wall 207 is a linear wall.

A first inner wall and a second inner wall may be provided for one battery to follow the shape of the battery (to follow the periphery of the battery). It is preferable because an inner partition wall (formed by the first inner wall and the second inner wall) is provided for each battery, and thereby other batteries are not affected even if a problem such as combustion occurs in one battery.

In FIG. 2, the first inner wall (206) and the second inner wall (207) are illustrated only in the vehicle width direction (the Y-axis direction in FIG. 2), but may extend in the traveling direction (the X-axis direction in FIG. 2).

2. Attachment to Lower Portion of Vehicle Body

It is preferable that the battery tray 105 in the present invention is attached to a lower portion of a vehicle body of an electric vehicle, and includes the first inner wall 206 and the second inner wall 207 along the vehicle width direction. With this design, the cross member can be easily installed in the vehicle width direction.

Here, the vehicle width direction is, for example, the Y direction in FIG. 1, and is the vehicle width direction. The vehicle width direction is also referred to as the left-right direction of the vehicle body. For example, in FIG. 1, the inner partition wall 107, which is the first inner wall and the second inner wall, extends in the vehicle width direction.

[Fiber-Reinforced Plastic]

1. Reinforcing Fiber

A reinforcing fiber contained in the fiber-reinforced plastic is not particularly limited, and is preferably one or more reinforcing fibers selected from the group consisting of carbon fibers, glass fibers, aramid fibers, boron fibers, and basalt fibers. The reinforcing fiber is more preferably glass fibers. When the glass fibers are used as the reinforcing fibers, an average fiber diameter of the glass fibers is preferably 1 μm to 50 μm, and more preferably 5 μm to 20 μm. When the average fiber diameter is large, impregnation of a resin into the fibers becomes easy, and when the average fiber diameter is equal to or smaller than an upper limit, moldability and processability are improved.

2. Discontinuous Fiber

The reinforcing fiber preferably contains discontinuous fibers. When the discontinuous fibers are used, formability is improved and it is easy to form a complicated molded product, as compared with a fiber-reinforced plastic using only continuous fibers.

3. Weight Average Fiber Length of Reinforcing Fiber

The weight average fiber length of the reinforcing fibers is preferably 1 mm or more, more preferably 1 mm or more and 100 mm or less, still more preferably 1 mm to 70 mm, and yet still more preferably 1 mm to 50 mm.

In recent years, a size of an in-vehicle battery has increased, and vertical and horizontal dimensions of a battery box are 1 m×1 m, 1.5×1.5 m, or the like. When the weight average fiber length is 1 mm or more, mechanical properties for storing a large battery are easily ensured even when such a large battery box is produced. When the weight average fiber length of the reinforcing fibers is 1 mm or more in the battery tray of the present invention, the battery tray itself can be easily provided with structural rigidity.

In the fiber-reinforced plastic produced by injection molding, the weight average fiber length of the reinforcing fibers is about 0.1 to 0.3 mm Therefore, when a weight average fiber length of the reinforcing fibers is 1 mm or more and 100 mm or less, the fiber-reinforced plastic is preferably produced by press molding.

It is preferable because fluidity is excellent when the weight average fiber length of the reinforcing fibers is 100 mm or less.

In the present invention, discontinuous reinforcing fibers having different fiber lengths may be used in combination. In other words, the discontinuous reinforcing fiber used in the present invention may have a single peak or a plurality of peaks in the distribution of the weight average fiber length.

4. Fiber Volume Fraction

The fiber volume fraction Vf of the reinforcing fibers is not particularly limited, and is preferably 20% to 70%, more preferably 25% to 60%, and still more preferably 30% to 55%.

The fiber volume fraction (Vf unit:volume %) refers to a ratio of a volume of reinforcing fibers to a volume of entire fiber-reinforced plastic including not only the reinforcing fibers and a matrix resin but also other additives.

5. Resin

In the present invention, the kind of the resin is not particularly limited, and a thermosetting resin or a thermoplastic resin is used. When a thermosetting resin is used, the thermosetting resin is preferably an unsaturated polyester-based resin, a vinyl ester-based resin, an epoxy-based resin, or a phenol-based resin.

As the resin, one kind may be used alone, or two or more kinds may be used in combination.

6. Other Agents

A fiber-reinforced plastic used in the present invention may contain additives such as various fibrous or non-fibrous fillers of organic fibers or inorganic fibers, inorganic fillers, flame retardants, UV resistant agents, stabilizers, release agents, pigments, softeners, plasticizers, and surfactants as long as the objects of the present invention are not impaired.

When a thermosetting resin is used, thickeners, curing agents, polymerization initiators, polymerization inhibitors, or the like may be contained.

As the additive, one kind may be used alone, or two or more kinds may be used in combination.

7. Sheet Molding Compound

The fiber-reinforced plastic of the present invention is preferably obtained by molding a sheet molding compound (also may be referred to as SMC) using reinforcing fibers. The sheet molding compound can be easily molded even in a complicated shape such as a battery tray or a battery cover due to its high moldability.

That is, a sheet molding compound is molded to manufacture a fiber-reinforced plastic, and a battery tray having recesses and protrusions can be manufactured. The sheet molding compound has fluidity and formability higher than those of continuous fibers, and can easily produce a rib and a boss.

As the fiber-reinforced plastic using the sheet molding compound (SMC), a sheet molding compound manufactured by Continental Structural Plastics (may be abbreviated as CSP) can be used.

[Dispersion of Discontinuous Fibers in Boundary Area]

It is preferable that discontinuous fibers are continuously dispersed in a boundary area between the first bottom portion 303 and the first inner wall 206, a boundary area between the first bottom portion 303 and the second inner wall 207, and a boundary area between the first bottom portion 303 and the peripheral wall 205.

Since the first bottom portion 303, the peripheral wall 205, the first inner wall 206, and the second inner wall 207 are formed by the integrally molded fiber-reinforced plastic, the discontinuous fibers can be easily and continuously dispersed in the boundary area.

The sentence "the reinforcing fibers are continuously dispersed in the boundary area" means that the reinforcing fibers may be continuously dispersed in at least a part of the boundary area, and is not required to be continuously dispersed in the entire boundary area.

When the reinforcing fibers are continuously dispersed in an in-plane direction in the boundary area, the mechanical properties of the boundary area are improved as compared with that in the related art.

When a partition wall corresponding to the first inner wall 206 or the second inner wall 207 is attached as a separate component without integrally molding the components of the battery box 101, it is necessary to fasten the partition wall to the first bottom portion 303. However, when an inner partition wall is attached as a separate component without being integrally molded, a fastening force with the first bottom portion 303 is inevitably reduced, and the fastening force becomes unstable.

[Minimum Thickness of Fiber-Reinforced Plastic]

In the present invention, the minimum thickness of the fiber-reinforced plastic is preferably 1.0 mm or more and less than 5 mm, more preferably 1.5 mm or more and less than 5 mm, still more preferably 2 mm or more and 5 mm or less, and yet still more preferably 3 mm or more and 5 mm or less. The minimum thickness of 5 mm or less is preferable from the viewpoint of weight reduction of a battery box. When the fiber-reinforced plastic has a minimum thickness of 1.0 mm or more, battery temperature is less likely to be affected by the outside air temperature.

In the case of a battery tray, the minimum thickness of the fiber-reinforced plastic is preferably 2 mm or more and less than 5 mm, and more preferably 3 mm or more and less than 5 mm.

In the case of the battery cover, the minimum thickness of the fiber-reinforced plastic is preferably 1 mm or more and less than 4 mm, and more preferably 1 mm or more and less than 3 mm

[Radius of Curvature of Inner Corner Portion]

It is preferable to form an inner corner portion having a radius of curvature of 1 mm or more and 10 mm or less in a boundary area between the first bottom portion 303 and the peripheral wall 205. The radius of curvature is more preferably 1 mm or more and 7 mm or less, and still more preferably 2 mm or more and 4 mm or less.

The inner corner portion in the boundary area between the first bottom portion 303 and the peripheral wall 205 is illustrated by R501 in FIG. 5C.

It is also preferable to form an inner corner portion having a radius of curvature of 1 mm or more and 10 mm or less in a boundary area between the first bottom portion 303 and the first inner wall 206. The inner corner portion in the boundary area between the first bottom portion 303 and the first inner wall 206 is illustrated by R520 in FIG. 5B. The radius of curvature is more preferably 1 mm or more and 7 mm or less, and still more preferably 2 mm or more and 4 mm or less.

It is also preferable to form an inner corner portion having a radius of curvature of 1 mm or more and 10 mm or less in a boundary area between the first bottom portion 303 and the second inner wall 207. The inner corner portion in the boundary area between the first bottom portion 303 and the second inner wall 207 is illustrated by R530 in FIG. 5B. The radius of curvature is more preferably 1 mm or more and 7 mm or less, and still more preferably 2 mm or more and 4 mm or less.

[Radius of Curvature of Outer Corner Portion]

It is preferable to form an outer corner portion having a radius of curvature of 2 mm or more and 11 mm or less in a boundary area between the first bottom portion 303 and the peripheral wall 205. The radius of curvature is more preferably 2 mm or more and 8 mm or less, and still more preferably 3 mm or more and 7 mm or less.

The outer corner portion in the boundary area between the first bottom portion 303 and the peripheral wall 205 is illustrated by R502 in FIG. 5C.

It is also preferable to form an outer corner portion having a radius of curvature of 2 mm or more and 11 mm or less in a boundary area between the first bottom portion 303 and the first inner wall 206. The outer corner portion in the boundary area between the first bottom portion 303 and the first inner wall 206 is illustrated by R521 in FIG. 5C. The radius of curvature is more preferably 2 mm or more and 8 mm or less, and still more preferably 3 mm or more and 7 mm or less.

It is also preferable to form an outer corner portion having a radius of curvature of 2 mm or more and 11 mm or less in a boundary area between the first bottom portion 303 and the second inner wall 207. The outer corner portion in the boundary area between the first bottom portion 303 and the second inner wall 207 is illustrated by R531 in FIG. 5B. The radius of curvature is more preferably 2 mm or more and 8 mm or less, and still more preferably 3 mm or more and 7 mm or less.

The radius of curvature of the outer corner portion is preferably larger than that of the inner corner portion.

[Energy Absorbing Member]

The vehicle structure of the present invention preferably includes an energy absorbing member 108, which is an energy absorbing member, on an outside of the peripheral wall of the battery tray 105.

With an increase in the amount of mounted batteries for automobiles, a size of the battery box 101 is increasing year by year. A length of the battery box 101 in the vehicle width direction is often 70% or more of a width of an automobile, and may be 80% or more of the width of the automobile. Therefore, when a large battery box 101 is mounted on the lower portion of the automobile, a load larger than that in the related art is input to the battery box 101 at the time of collision. Therefore, it is preferable to have an energy absorbing structure for protecting the battery itself.

The energy absorbing member 108, which is an energy absorbing member, is preferably provided in order to absorb energy from the vehicle width direction, and is preferably provided along the outside of the peripheral wall in the front-rear direction of the vehicle body.

The cross member 701 may be joined to the energy absorbing member 108, which is an energy absorbing member. Accordingly, when an impact is applied to one side surface of the vehicle, in addition to the energy absorbing member on the impact receiving side, the energy absorbing member on the side opposite to the impact receiving side can also contribute to the absorption of the impact energy.

The lowermost part of the energy absorbing member 108 is preferably located at a lower position than the lowermost part of the battery tray 105. More preferably, the lowermost part of the energy absorbing member 108 is below the first bottom portion 303 of the battery tray 105, and the uppermost portion of the energy absorbing member 108 is above the first bottom portion 303 of the battery tray 105 when viewed from the vehicle width direction.

When the first bottom portion 303 of the battery tray 105 is covered with the energy absorbing member 108 when viewed from the vehicle width direction, the first bottom portion 303 of the battery tray 105 can be protected by the energy absorbing member 108 in the event of a collision.

Further, by adjusting the vertical position (height) of the energy absorbing member 108, it is possible to protect the battery tray 105 from the impact received from below when the protective wall 1001 described later is provided.

[Protective Wall]

The vehicle structure may include a protective wall below the battery tray.

1. The Details are as Follows.

Provided is a vehicle structure including a battery tray and a protective wall provided below the battery tray. Each of the battery tray and the protective wall is made of a fiber-reinforced plastic. The protective wall is fastened to at least one location of the battery tray by a fastening rod. An insertion hole for fastening is integrally molded in the battery tray.

Figure 10:
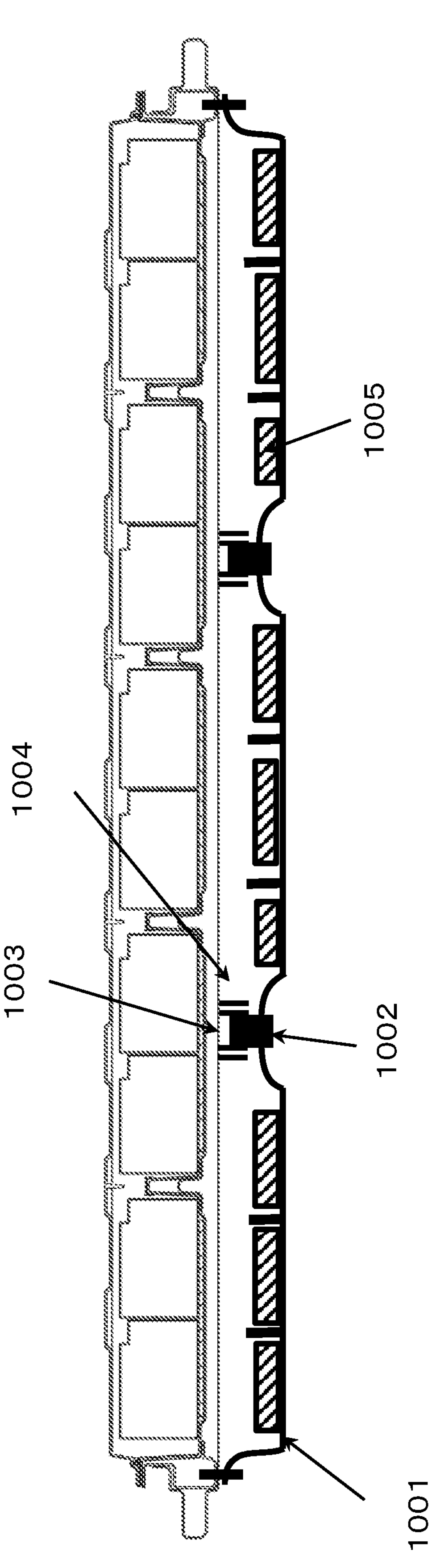
FIG. 10 is a schematic view illustrating an example of a vehicle structure including a protective wall below a battery tray.

An example of the protective wall is denoted by 1001 in FIG. 10. The fastening rod is denoted by 1002 in FIG. 10, and the insertion hole is denoted by 1003 in FIG. 10.

The protective wall 1001 under the battery tray 105 is preferably connected to the energy absorbing member 108. The protective wall 1001 can protect the battery tray 105 from the impact received from below.

2. Insertion Hole

It is preferable that an insertion table (1004 in FIG. 10) protruding from the battery tray toward the protective wall is provided, and the insertion hole is disposed inside an insertion table.

3. Impact-Absorbing Member

An impact-absorbing member (1005 in FIG. 10) is preferably disposed between the battery tray and the protective wall. In addition, the impact-absorbing member more preferably has a honeycomb structure. By providing such an impact-absorbing member, the resistance of impact from the lower portion of the vehicle is improved.

4. Aerodynamic Plate for Regulating Airflow

The protective wall is preferably a fiber-reinforced plastic provided with an aerodynamic plate for regulating airflow by integral molding, and the aerodynamic plate for regulating airflow may be provided below the protective wall. By providing the aerodynamic plate for regulating airflow, the aerodynamic drag is reduced, and the traveling stability of the vehicle is improved.

5. Electromagnetic Wave Shielding Layer

It is preferable to provide an electromagnetic wave shielding layer between the protective wall and the battery tray. More specifically, the electromagnetic wave shielding layer may be provided on an upper surface of the protective wall. In this case, the impact-absorbing member is preferably disposed above the electromagnetic wave shielding layer.

6. Material for Protective Wall 6.1 The protective wall may be a fiber-reinforced plastic obtained by molding a sheet molding compound containing reinforcing fibers and a thermosetting resin.

6.2 The protective wall may be a fiber-reinforced plastic obtained by molding a composite material containing reinforcing fibers and a thermoplastic resin.

7. Thickness of Protective Wall

The thickness of the protective wall is preferably 1 mm or more, more preferably 3 mm or more, and still more preferably 5 mm or more.

REFERENCE SIGNS LIST

- 101: Battery box
- 102: Battery cover
- 103: Battery
- 104: Temperature control system (cooling mechanism)
- 105: Battery tray
- 106: Reinforcing frame
- 107: Inner partition wall formed by first inner wall and second inner wall
- 108: Energy absorbing member (member capable of absorbing energy)
- 201: Top portion of inner partition wall
- 205: Peripheral wall
- 206: First inner wall
- 207: Second inner wall
- 208: Recessed portion extending in vehicle width direction
- 301: Second bottom portion
- 302: Cooling mechanism
- 303: First bottom portion
- 304: Metal cover
- 313: Space area surrounded by first inner wall, second inner wall, and second bottom portion (or stud bolt base)
- 402: Flange
- 407: Stud bolt base
- 408: Upper surface of stud bolt base
- 409: Stud bolt
- 411: Battery bracket
- 412: Insertion hole
- $\alpha$: Angle formed by first bottom portion and first inner wall β: Angle formed by first bottom portion and second inner wall h1: Height from first bottom portion to flange h2: Height from first bottom portion to upper surface of stud bolt base h3: Height from first bottom portion to second bottom portion

R501: Inner corner portion in boundary area between first bottom portion and peripheral wall

R502: Outer corner portion in boundary area between first bottom portion and peripheral wall

R520: Inner corner portion in boundary area between first bottom portion and first inner wall

R521: Outer corner portion in boundary area between first bottom portion and first inner wall

R530: Inner corner portion in boundary area between first bottom portion and second inner wall

R531: Outer corner portion in boundary area between first bottom portion and second inner wall

701: Cross member

702: Rib

703: Space between cross member and second bottom portion, which is formed when cross member is inserted into recessed portion

801: Battery cover

802: Rib

1001: Protective wall

1002: Fastening rod

1003: Insertion hole

1004: Insertion table

1005: Impact-absorbing member

The invention claimed is:

1. A battery structure comprising a battery tray disposed at a lower portion of a center of a vehicle body, and a cross member extending in a vehicle width direction, which is inserted into the battery tray, wherein (1) the battery tray includes a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion, (2) the first bottom portion, the peripheral wall, the first inner wall, the second inner wall, and the second bottom portion are configured with an integrally molded fiber-reinforced plastic, (3) a recessed portion extending in the vehicle width direction is formed by the first inner wall, the second inner wall, and the second bottom portion, and the cross member is inserted into at least one location of the recessed portion, and (4) wherein discontinuous fibers are continuously dispersed in a boundary area between the first bottom portion and the first inner wall, a boundary area between the first bottom portion and the second inner wall, and a boundary area between the first bottom portion and the peripheral wall.

2. The battery structure according to claim 1, wherein the cross member is bent in a protruding shape along the recessed portion.

3. The battery structure according to claim 2, wherein the cross member is formed by pressing and bending a flat metal plate to have a protruding shape along the recessed portion.

4. The battery structure according to claim 1, wherein the cross member has a thickness of 0.5 mm or more and 6.0 mm or less.

5. The battery structure according to claim 1, wherein a space is provided between the cross member and the second bottom portion.

6. The battery structure according to claim 1, wherein the cross member is fitted into the recessed portion.

7. The battery structure according to claim 1, wherein the structure includes a plurality of cross members.

8. The battery structure according to claim 1, wherein the cross member is made of metal or a continuous fiber-reinforced composite material.

9. The battery structure according to claim 1, wherein the battery tray is configured with a fiber-reinforced plastic integrally molded using a sheet molding compound.

10. The battery structure according to claim 9, wherein a weight average fiber length of the reinforcing fibers contained in the fiber-reinforced plastic is 1 mm or more.

11. The battery structure according to claim 1, wherein a closed cross section structure is formed by the first inner wall, the second inner wall portion, the second bottom portion, and the cross member when a cross section of the structure is observed from the vehicle width direction.

12. The battery structure according to claim 1, wherein a natural frequency of the battery tray in a primary mode is 25 Hz or more.

13. The battery structure according to claim 1, wherein a rib integrally molded with the battery tray is provided in at least one location of the recessed portion.

14. The battery structure according to claim 1, wherein an angle formed by the first bottom portion and the first inner wall and an angle formed by the first bottom portion and the second inner wall are 90 degrees or more and 135 degrees or less.

15. The battery structure according to claim 1, wherein a rib or a boss for fixing a battery is provided on an upper surface of the first bottom portion.

16. The battery structure according to claim 1, wherein at least one of the first inner wall and the second inner wall has a shape following a battery shape.

17. The battery structure according to claim 1, wherein the first inner wall and the second inner wall extend at least along the vehicle width direction.

18. The battery structure according to claim 1, wherein the battery tray includes a stud bolt base connected to both the first inner wall and the second inner wall and raised from a first bottom portion, and the stud bolt base is configured with a fiber-reinforced plastic integrally molded with the first bottom portion, the peripheral wall, the first inner wall, the second inner wall, and the second bottom portion.

19. The battery structure according to claim 18, wherein a stud bolt for attaching a battery bracket is provided on the stud bolt base.

20. The battery structure according to claim 19, wherein the stud bolt base includes a non-penetrating insertion hole, and the stud bolt is inserted into the insertion hole.

21. A battery tray disposed in a lower portion of a center of a vehicle body, wherein (1) the battery tray comprises a first bottom portion, a peripheral wall erected on an outer periphery of the first bottom portion, a first inner wall connected to the first bottom portion, a second inner wall connected to the first bottom portion, and a second bottom portion connected to both the first inner wall and the second inner wall and raised from the first bottom portion, (2) the first bottom portion, the peripheral wall, the first inner wall, the second inner wall, and the second bottom portion are configured with an integrally molded fiber-reinforced plastic, (3) a recessed portion extending in a vehicle width direction is formed by the first inner wall, the second inner wall, and the second bottom portion, (4) a rib integrally molded with the battery tray is provided in at least one location of the recessed portion, and (5) wherein discontinuous fibers are continuously dispersed in a boundary area between the first bottom portion and the first inner wall, a boundary area between the first bottom portion and the second inner wall, and a boundary area between the first bottom portion and the peripheral wall.

22. The battery tray according to claim 21, wherein a natural frequency of the battery tray in a primary mode is 25 Hz or more.

23. The battery structure according to claim 1, further comprising an energy absorbing member on an outside of the peripheral wall of the battery tray, wherein a lowermost part of the energy absorbing member is located at a lower position than a lowermost part of the battery tray.

24. The battery structure according to claim 23, wherein the lowermost part of the energy absorbing member is below the first bottom portion of the battery tray, and an uppermost portion of the energy absorbing member is above the first bottom portion of the battery tray.

25. The battery structure according to claim 23, further comprising a protective wall below the battery tray, wherein the protective wall is connected to the energy absorbing member.

* * * * *